United States Patent [19]

Bernier

[11] Patent Number: 5,016,691
[45] Date of Patent: May 21, 1991

[54] APPARATUS FOR CENTERING TEMPLATE GUIDE ON ROUTER

[76] Inventor: Lucien Bernier, 570 Citation Way, Thousand Oaks, Calif. 91320

[21] Appl. No.: 540,095

[22] Filed: Jun. 19, 1990

[51] Int. Cl.⁵ ............................................... B27C 5/10
[52] U.S. Cl. ................................ 144/134 D; 33/639; 144/136 C; 409/182
[58] Field of Search ................ 409/182; 144/134 D, 144/136 C; 33/636, 639, 644, 645

[56] References Cited

U.S. PATENT DOCUMENTS 3,908,510  9/1975  Koskolos et al. ............... 409/182
4,102,370  7/1978  Vess ................................ 409/182
4,652,191  3/1987  Bernier ........................... 409/182

Primary Examiner—W. Donald Bray
Attorney, Agent, or Firm—Arthur F. Zobal; Geoffrey A. Mantooth

[57] ABSTRACT

A centering apparatus aligns a template guide bushing on a router such that the bushing is centered with respect to the shaft of a cutting tool. The centering apparatus has a shaft and a conical member slidingly located on the shaft. The shaft is substituted for the cutting tool shaft in the router, wherein the conical member is moved along the shaft into contact with the template guide bushing for centering.

8 Claims, 1 Drawing Sheet

APPARATUS FOR CENTERING TEMPLATE GUIDE ON ROUTER

FIELD OF THE INVENTION

The present invention relates to routers which may be used in, for example, woodworking.

BACKGROUND OF THE INVENTION

Portable routers are used in woodworking to form edges and make shaped cuts. Routers have a frame with a base section; the base section rests on the wood to provide a reference for the cutting tool. A motor for rotating the cutting tool is provided inside of the frame.

Routers have some type of adjustment mechanism to adjust the depth of cut. This adjustment is typically done by moving the motor with respect to the frame. As the motor is retracted from the base, the cutting tool is pulled back, reducing the depth of cut. As the motor is advanced toward the base section, the cutting tool is also advanced, increasing the depth of cut.

Routers may be provided with a cylindrical bushing around the cutting tool that is used as a guide for following a template during cutting operations. To ensure accurate cutting with the guide bushing, the guide bushing must be aligned so as to be centered with respect to the cutting tool. In the prior art, the bushing is centered by measurement; the distance between the bushing and the cutting edge of the cutting tool is measured and the bushing is centered accordingly. This is a time consuming and inaccurate procedure, however.

I have developed a novel press router, which is shown and described in U.S. Pat. No. 4,652,191. In the router of the '191 patent, a conical alignment fixture is used to center the bushing. The alignment fixture has a rod and an integral conical portion. To center the bushing, the rod is inserted through the bushing and is coupled to the motor by way of the collet. Then, the motor is retracted into the frame to retract the conical portion. The conical portion contacts the bushing, wherein the bushing is centered. The bushing is then secured to the base.

My patented router permits adjustment of the cutting depth without affecting the lateral position of the cutting tool shaft. Thus, the guide bushing is centered by moving the motor with respect to the bushing. In fact, the only way to center the bushing with the fixture of the '191 patent is to move the motor relative to the bushing, because the conical portion is integral to the shaft. But, in some conventional routers, adjusting the cutting depth will affect the location of the cutting tool shaft relative to the bushing. Thus, the bushing should be centered after the cutting depth is fixed. But, with the fixture of the '191 patent, the conical portion is fixed to the shaft, so that the conical portion is unable to move into contact with the bushing once the cutting depth is fixed. Thus, what is needed is a centering fixture that will center guide bushings on conventional routers.

SUMMARY OF THE INVENTION

It is an object of the present invention to provide an apparatus for centering a template bushing guide on a router, which router changes the location of the cutting tool shaft when the cutting depth is fixed.

The centering apparatus of the present invention is used for centering a hollow cylindrical template guide in a router. The centering apparatus includes a shaft and a conical member. The shaft has first and second ends, with the shaft being adapted to be received by the router so as the extend through said guide. The conical member also has first and second ends. The conical member has an exterior surface extending between the conical member first and second ends. The exterior surface is conical in shape. The exterior surface is adapted to engage the hollow guide. The conical member has a passage extending between the conical member first and second ends. The passage receives the shaft such that the conical member can slide along the shaft, wherein the conical member can move along the shaft to center the guide when the shaft is received by the router.

In one aspect, the centering apparatus also includes retaining means for retaining the conical member on the shaft. In still another aspect, the retaining means includes a removable flexible plastic cap that fits onto at least one of the shaft first and second ends. The cap forms an interference fit with the respective shaft end.

In still another aspect, the centering apparatus includes plural shafts, with each shaft having first and second ends. The shafts have the same diameter. The first end of each of the shafts have an adaptor coupled thereto. The adaptors have different outside diameters so as to be adapted to be received by router collets of various sizes. The conical member has an exterior surface that is conical in shape and a passage that is adapted to receive each of the shafts such that the conical member can slide along the respective shafts.

In still another aspect, a method of centering a cylindrical template guide in a router includes the steps of providing a conical member having an exterior surface. The exterior surface is conical in shape around a longitudinal axis of the conical member. The conical member is slidingly disposed on a shaft such that the shaft is coaxial with the longitudinal axis. One end of the shaft is coupled to the router such that the shaft extends through the guide opening. The conical member is moved along the shaft so as to contact a rim of the guide opening. The guide opening is moved with respect to the conical member so as to fully seat the conical member into the guide opening. The position of the guide opening is fixedly coupled to the router. The conical member and the shaft are removed from the router.

DESCRIPTION OF PREFERRED EMBODIMENT

Figure 1:
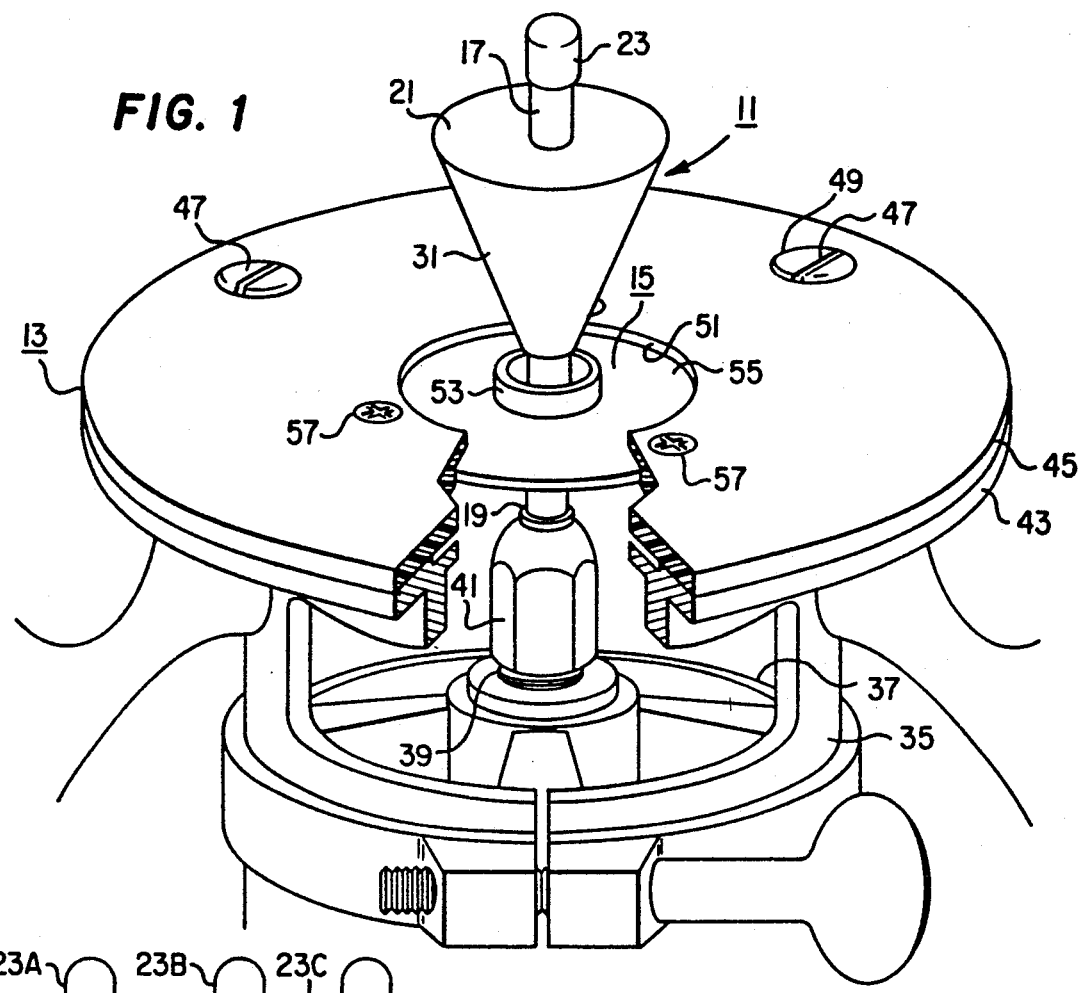
FIG. 1 is an isometric view of an inverted router, with a partially cut away base to show the centering apparatus of the present invention, in accordance with a preferred embodiment.
Figure 2:
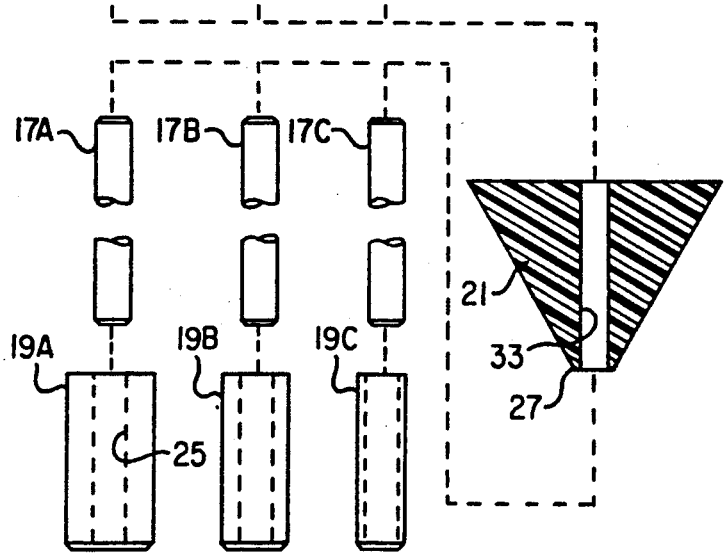
FIG. 2 is an exploded side view of a centering apparatus kit for use in aligning template guide bushings with various sized routers, showing the conical member in longitudinal cross-section.
Figure 3:
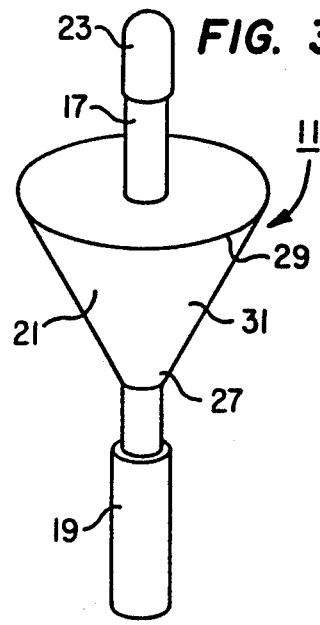
FIG. 3 is an isometric view of the centering apparatus.

In the FIGS., there is shown the centering apparatus 11 of the present invention, in accordance with a preferred embodiment. The centering apparatus 11 is used in conjunction with a router 13, as shown in FIG. 1, to center a template guide bushing 15 with respect to the shaft of a cutting tool (not shown).

The centering apparatus 11 includes a shaft 17, an adaptor 19, a conical member 21, and a cap 23. The apparatus 11 is provided in kit form, wherein plural shafts and adaptors are provided so that the apparatus may be used with router collets of all sizes. There is provided a shaft and an adaptor for each router collet size.

Each shaft 17 is cylindrical and has two ends. The shafts are of the same length and diameter. The shafts are made of steel. One end of each shaft 17 is received by an adaptor 19. The adaptors are cylindrical bushings, having passages 25 therethrough. The end of the respective shaft is fitted into the adaptor passage. In the preferred embodiment, the adaptors 19 are made of high impact plastic. Each shaft 17 is coupled to its respective adaptor 19 by a suitable conventional adhesive. The adaptors have different outside diameters, which correspond to the shaft sizes that will fit available router collets. Router collets come in three sizes; one size receives ¼ inch diameter shafts of cutting tools, another size receives ⅜ inch diameter shafts, and still another size receives ½ inch diameter shafts. Thus, there is provided a first shaft 17A and its associated first adaptor 19A having an outside diameter of ¼ inch, a second shaft 17B and its associated second adaptor 19B having an outside diameter of ⅜ inch, and a third shaft 17C and its associated third adaptor 19C having an outside diameter of ½ inch. Each shaft is provided with a cap 23A, 23B, 23C at its free end. These three shafts and their associated adaptors enable the centering apparatus to be used on routers of all sizes.

The conical member 21 has first and second ends 27, 29 and has an exterior surface 31 extending between the first and second ends. The exterior surface 31 is conical in shape. Thus, the outside diameter of the first end 27 is smaller than the outside diameter of the second end 29. The outside diameter of the second end is larger than the largest template guide bushing cylindrical portion 53 that is used on the router 13. The conical member 21 has an interior passage 33 that extends between the first and second ends 27, 29. The conical member 21 is assembled onto the respective shaft 17 such that the passage 33 receives the shaft. The inside diameter of the passage 33 is slightly larger than the outside diameter of the shaft 17, such that the conical member 21 can slide along the shaft. The shaft 17 is several times longer than the conical member. The conical member is made of a plastic material and may be injection molded.

A flexible plastic end cap 23 is provided on the free end of the shaft. The cap 23 prevents the conical member 21 from sliding off of the shaft. The cap is retained on the shaft end by an interference fit. The bushing 19 prevents the conical member 21 from sliding off of the other end of the shaft.

The centering apparatus is used with a router 13, which is shown in FIG. 1. My U.S. Pat. No. 4,652,191 shows and describes a router. The disclosure of U.S. Pat. No. 4,652,191 is incorporated by reference into this disclosure. Consequently, the router 13 will be described herein only to the extent that the description has particular relevance to the centering apparatus of the present invention.

The router has a frame 35 with a cavity therein for receiving a motor 37. The motor 37 has a collet 39 for receiving the shaft of a cutting tool, and a collet nut 41 for retaining the cutting tool shaft. At one end of the frame 35 is the base 43. The motor 37 is coupled to the frame 35 such that the motor and the cutting tool can be moved relative to the base, so as to adjust the depth of cut. Coupled to the outer end of the base 43 is the subbase 45, which provides a flat, non-marring surface to contact the work piece. The subbase 45 is secured to the base by lock screws 47. The holes 49 in the subbase 45 that receive the screws 47 are larger than the screws 47, thereby allowing lateral movement of the subbase 45 relative to the base 43 for alignment purposes. The subbase 45 has a central opening 51 for receiving the cutting tool and a cylindrical portion 53 of the template guide bushing 15. The cylindrical portion 53 has an opening therethrough for receiving the shaft of a cutting tool. The bushing 15 has a wide disc portion 55 for coupling to the inside of the subbase 45 by way of screws 57.

Template guide bushings 15 are interchangeable to provide for bushings of various outside diameters for various routing tasks. To install a template guide bushing 15, the subbase 45 is removed from the base 43 by unscrewing the screws 47. Then, if the subbase 45 already has a template guide bushing, it is uncoupled by removing the screws 57. A template guide bushing 15 of the desired size is installed onto the subbase 45 with the screws 57, and the subbase 45 is reassembled onto the base 43 with the screws 47.

The new template guide bushing 15 must be aligned so that its cylindrical portion 53 is centered with respect to the shaft of the cutting tool. This ensures an accurate cut. During centering, the shaft 17 of the centering apparatus is effectively substituted for the shaft of the cutting tool. The template guide bushing 15 is centered as follows: the lock screws 47 are loosened to allow the subbase 45 to move relative to the base 43. Then, an appropriate shaft 17 is selected, which is the shaft having the appropriate sized adaptor 19 for the particular router that is being used. Because the shafts 17A, 17B, 17C are all of the same diameter, the shafts are interchangeable with each other so that the single conical member 21 can be used on any shaft. The cap 23 is removed from the shaft and the conical member 21 is inserted onto the shaft such that the first end 27 is adjacent to the adaptor 19. The cap 23 is replaced to retain the conical member on the shaft. The adaptor 19 is inserted through the cylindrical portion 53 of the guide bushing 15 and into the collet 39 as shown in FIG. 1. The collet nut 41 is then tightened. The conical member 21 is moved along the shaft 17 until it contacts the cylindrical portion 53. The subbase 45 is moved laterally until the conical member 21 is fully seated in the cylindrical portion, wherein the cylindrical portion 53 contacts the conical member 21 for 360 degrees. The cylindrical portion 53 is now centered. The lock screws 47 are tightened to retain this position.

The centering apparatus 11 is particularly useful for centering template guide bushings on those types of routers where the operation of locking the cutting depth of the cutting tool moves the cutting tool shaft in a lateral direction. On routers of this type, the cutting depth must be set and locked first before the template guide bushing is centered because locking the cutting depth moves the cutting tool shaft to a new position. But, by locking in the cutting depth, the motor 37 is prevented from moving with respect to the base 43. With the centering apparatus 11 of the present invention, the motor need not be moved with respect to the base to center the template guide bushing because the conical member 21 moves along the shaft to contact the guide bushing 15.

To center the template guide bushing 15 on routers of this type, the cutting tool is inserted into the collet and the collet nut is tightened. The cutting depth is adjusted and the motor is then locked in place to prevent further movement with respect to the base. The cutting tool is removed and the appropriate sized shaft 17 is inserted into the collet 39. Centering is performed as described above wherein the conical member 21 is moved along the shaft 17 to contact the bushing 15.

With those types of routers wherein locking the motor to set the cutting depth moves the cutting tool shaft laterally, the template guide bushing 15 must be recentered after every adjustment of the cutting depth. The centering apparatus 11 allows an operator to recenter the template guide bushing quickly and easily.

The centering apparatus of the present invention will center template guide bushings of all sizes because the conical surface 31 will fit cylindrical portions 53 of all sizes. Furthermore, with the various sized adaptors 19, the centering apparatus will fit all types of routers.

Although the centering apparatus has been described as having plural shafts, only one shaft need be provided. The diameter of the shaft may be ¼ inches, ⅜ inches or ½ inches to correspond to a particular collet. The ends of the shaft have permanent retaining means to retain the conical member thereon. The conical member of course is still free to slide along the shaft between the ends.

The foregoing disclosure and the showings made in the drawings are merely illustrative of the principles of this invention and are not to be interpreted in a limiting sense.

I claim:

1. A centering apparatus for centering a hollow cylindrical template guide in a router, comprising:
   (a) a shaft having first and second ends, said shaft being adapted to be received by said router so as to extend through said guide;
   (b) a conical member having first and second ends, said conical member having an exterior surface extending between said conical member first and second ends, said exterior surface being conical in shape, said exterior surface being adapted to engage said hollow guide;
   (c) said conical member having a passage extending between said conical member first and second ends, said passage receiving said shaft such that said conical member can slide along said shaft, wherein said conical member can move along said shaft to center said guide when said shaft is received by said router.

2. The centering apparatus of claim 1 further comprising retaining means for retaining said conical member on said shaft, said retaining means being coupled to said shaft at said shaft first and second ends.

3. The centering apparatus of claim 2 wherein said retaining means comprises a removable flexible plastic cap that fits onto at least one of said shaft first and second ends, said cap forming an interference fit with said respective shaft end.

4. A router, comprising:
   (a) a base having a flat surface adapted to be located on a work piece, said base having an aperture for receiving a router cutting tool;
   (b) a frame connected to said base and having an opening for receiving a router motor assembly including said router cutting tool, said motor assembly being coupled to said frame;
   (c) a hollow cylindrical template guide attachable to said base, said guide having an opening therethrough for receiving said cutting tool, said guide being movable relative to said base to permit the centering of said guide relative to said cutting tool;
   (d) a shaft having first and second ends, said shaft being adapted to be received by said motor assembly in place of said cutting tool;
   (e) a conical member having first and second ends, said conical member having an exterior surface extending between said conical member first and second ends, said exterior surface being conical in shape, said conical member second end having a larger diameter than said guide opening, said exterior surface being adapted to engage said guide opening;
   (f) said conical member having a passage extending between said conical member first and second ends, said passage receiving said shaft such that said conical member can slide along said shaft, wherein said conical member can slide along said shaft to contact said guide opening so as to center said guide with respect to said shaft.

5. A centering apparatus for centering a hollow cylindrical template guide in a router, comprising:
   (a) plural shafts with each shaft having first and second ends, said shafts having the same diameter, said first end of each of said shafts having an adaptor coupled thereto, said adaptors having different outside diameters so as to be adapted to be received by router collets of various sizes;
   (b) a conical member having first and second ends, said conical member having an exterior surface extending between said conical member first and second ends, said exterior surface being conical in shape, said exterior surface being adapted to engage said guide;
   (c) said conical member having a passage extending between said conical member first and second ends, said passage being adapted to receive each of said shafts such that said conical member can slide along said respective shafts.

6. The centering apparatus of claim 5 further comprising removable retaining means for retaining said conical member on each of said shafts, said retaining means being coupled to said shaft second ends.

7. The centering apparatus of claim 6 wherein said retaining means comprises a flexible plastic cap that forms an interference fit with each of said shaft second ends.

8. A method of centering a cylindrical template guide in a router, said guide having an opening therethrough for receiving a cutting tool, comprising the steps of:
   (a) providing a conical member having an exterior surface, said exterior surface being conical in shape around a longitudinal axis of said conical member, said conical member being slidingly disposed on a shaft such that said shaft is coaxial with said longitudinal axis;
   (b) coupling one end of said shaft to said router such that said shaft extends through said guide opening;
   (c) moving said conical member along said shaft so as to contact a rim of said guide opening;
   (d) moving said guide opening with respect to said conical member so as to fully seat said conical member into said guide opening;
   (e) fixedly coupling the position of said guide opening to said router;
   (f) removing said conical member and said shaft from said router.

* * * * *
* * * * *